United States Patent [19]

Manley et al.

[11] 3,794,989

[45] Feb. 26, 1974

[54] APPLIANCE THEFT ALARM SYSTEM

[76] Inventors: William T. Manley, 1825 Rockland Dr., S.E., Atlanta, Ga. 30316; Emory T. Manley, 2898 Parkridge Dr., N.E., Atlanta, Ga. 30319

[22] Filed: Apr. 7, 1972

[21] Appl. No.: 242,033

[52] U.S. Cl. .......... 340/280, 340/256, 340/252 R, 340/253 R, 315/120

[51] Int. Cl. .......... G08b 21/00

[58] Field of Search...340/280, 256, 421, 276, 248 R, 340/248 E, 252 R, 253 R, 253 C; 315/119, 120, 133, 125; 324/51

[56] References Cited

UNITED STATES PATENTS

| | | | |
|---|---|---|---|
| 3,067,411 | 12/1962 | Dhimos | 340/251 |
| 3,444,547 | 5/1969 | Surek | 340/280 |
| 3,425,050 | 1/1969 | Tellerman et al. | 340/256 |
| 3,537,095 | 10/1970 | Cones | 340/280 |

*Primary Examiner*—John W. Caldwell
*Assistant Examiner*—William M. Wannisky
*Attorney, Agent, or Firm*—Jones, Thomas & Askew

[57] ABSTRACT

Alarm system for indicating unauthorized disconnection of an appliance such as a TV receiver or the like. The alarm system includes an indication device, such as a lamp, connected in series with a signal apparatus to receive a source of operating power. A shunt circuit including the appliance circuit or other circuit being monitored is connected to bypass the signal apparatus, so that current normally flows through the indication device and the shunt circuit to operate the indication device when the monitored circuit is uninterrupted. Opening of the monitored circuit, such as by unauthorized disconnection of a TV receiver, opens the shunt circuit and permits current to flow through the signal apparatus, initiating an appropriate alarm or other signal. The current flowing through the series circuit may be less than the amount necessary to produce the indication normally present while the monitored circuit is uninterrupted.

9 Claims, 1 Drawing Figure

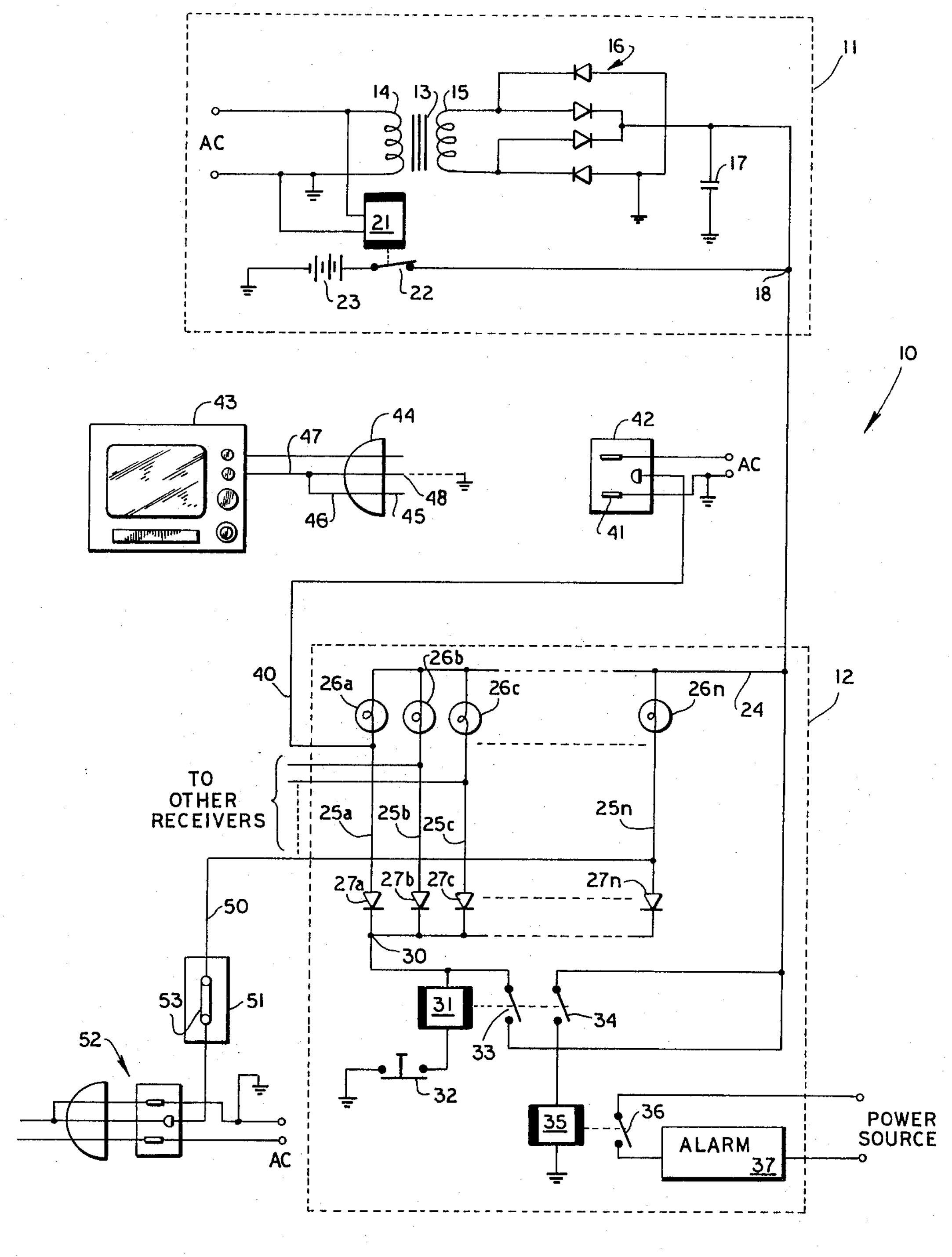
AC
14
13
15
16
11
17
21
23
22
18
10
43
47
44
46
45
48
42
AC
41
40
26a
26b
26c
26n
24
12
TO
OTHER
RECEIVERS
25a
25b
25c
25n
27a
27b
27c
27n
30
50
53
51
52
31
33
34
32
35
36
ALARM
37
POWER
SOURCE
AC

APPLIANCE THEFT ALARM SYSTEM

This invention relates in general to circuit monitoring apparatus and in particular to apparatus for detecting and signalling the unauthorized disconnection of an appliance such as a TV receiver from a power source.

Virtually all modern motels and hotels are now equipped with a TV receiver in every room, and many such establishments are becoming equipped with relatively expensive color TV receivers. These same motels and hotels are unfortunately plagued with recurring theft of the TV receivers from the rooms, with such theft being especially prevalent in motels having rooms which are typically located adjacent to automobile parking areas and which may be located some distance from the central desk of the motel. TV receivers are especially vulnerable to such thievery, since these receivers provide an object which is readily portable yet which commands a substantial resale price to the thief. Since the replacement cost of a contemporary color TV receiver may amount to several hundred dollars, and since such receivers and their thieves are difficult or impossible to trace or apprehend, once the receiver is actually removed from the premises, it will be readily understood that motel and hotel operators regularly suffer sizeable economic losses from such activity.

Moreover, the problems of detecting the unauthorized removal of TV receivers and other appliances is not limited to motels and hotels, since virtually every apartment building or group of apartments contains TV receivers, stereos and other valuable appliances which are subject to theft in the absence of the tenants.

Devices and apparatus have been proposed in the prior art which would be interconnected with a TV receiver in some manner to produce a signal when the receiver is disconnected or otherwise removed from its normal location. One such prior art apparatus, for example, establishes a special circuit including the coaxial antenna cable connected to each TV receiver in an establishment provided with a central antenna system. Disconnecting the coaxial cable, whether by unscrewing the connector or by cutting the cable, opens the special circuit and produces a signal. Another such prior art apparatus includes a miniature transmitter associated with the power plugin location for each TV receiver, and broadcasts a signal to be received at the motel office or other central location upon disconnection of the receiver.

Such prior art attempts to solve the appliance theft problem have not met with widespread acceptance for a number of reasons. Such apparatus has tended to require numerous and complex circuits, such as electrical bridge circuits, which may require adjustment or compensation for the resistance of electrical wire between the bridge and the actual location of the appliance to be monitored, and which become expensive to manufacture for large-scale applications. Many motels and hotels are unequipped with a central TV antenna system, moreover, and so the cost of adding a TV receiver theft alarm system to these motels or hotels would include the additional substantial expense of installing a central antenna system. Further yet, such prior systems frequently exhibit operational and other deficiencies which have hindered their widespread acceptance.

Accordingly, it is an object of the present invention to provide an improved apparatus for detecting unauthorized interruption of an electric circuit.

It is another object of the present invention to provide an improved apparatus for detecting the unauthorized disconnection of an electrical appliance.

It is a further object of the present invention to provide an appliance theft alarm system which is also readily adaptable to provide an alarm indicating the presence of fire, smoke, or other conditions.

It is a further object of the present invention to provide an appliance theft alarm system which affords a positive indication of appliance connection circuits operating in a normal, uninterrupted manner.

Other objects and many of the attendant advantages of the present invention will become more readily apparent from the following description of a preferred embodiment of the invention, including the annexed drawing in which:

The Figure shows a schematic diagram of a multiple TV receiver theft alarm system, including a provision for fire detection, according to the disclosed embodiment of the present invention.

Stated in general terms, the present invention establishes a series circuit including a indication circuit element and a signal circuit element, with a shunt around the signal circuit element being established through the circuit to be monitored. Current flowing through the indication circuit element and the shunt, during uninterrupted conditions of the monitored circuit, produces an indication noting the fact of uninterruption. When the shunt circuit is interrupted by unauthorized disconnection of the monitored circuit, however, current now flows through the series circuit including the signal circuit element. The reduced current flow through the indication circuit element causes the indication to terminate, and the current now flowing through the signal circuit element now produces an appropriate signal or alarm.

More particularly, and with reference taken to the Figure for an illustration of the disclosed embodiment of the present invention, there is shown an appliance theft alarm system indicated generally at 10 and including a power supply section outlined at 11 and a central alarm section outlined at 12. The power supply section 11 and the central alarm section 12 are separately defined in the Figure for purposes of illustration, although it will be understood by those skilled in the art that components of the power supply section and the central alarm section typically would be provided within a single chassis or other arrangement of apparatus. The power supply section 11 includes a transformer 13 having a primary winding 14 connected to a source of AC power and a secondary winding 15 connected to a rectifier circuit 16, from which is produced pulsating DC power which is smoothed by the capacitor 17. A source of DC operating power at a volage, for example, of 12 volts is available at the terminal 18 for supply to the central alarm section 12.

The coil of a relay 21 may be connected across the AC input in parallel with the primary winding 14. The normally-closed contact 22 of the relay 21 is connected in circuit with a source of auxiliary power, such as the battery 23, and the terminal 18. It will be seen that the contact 22 is maintained open by the presence of AC power applied to the primary winding 14 and becomes closed to apply power from the battery 23 to the terminal 18 only in the event of AC line power failure or some other interruption of the AC power applied to the primary winding. It will be apparent to those skilled in the art, of course, that the provision of an auxiliary power supply is not essential to the construction and operation of the present invention.

Power is supplied from the terminal 18 along a line 24 to be supplied to a number of parallel circuits 25*a*, 25*b*, 25*c*, . . . . 25*n*. Each of these parallel circuits includes an indicator such as an electric lamp 26*a*, 26*b*, 26*c*, . . . 26*n* and a unidirectional current flow device such as the diodes 27*a*, 27*b*, 27*c*, . . . 27*n*, and it will become apparent that a number of the parallel circuits 25 are provided equal in number to the number of TV receivers or other appliances the theft or unauthorized disconnection of which is to be monitored.

The parallel circuits are connected in common as at 30 to the operating coil of a relay 31, and thence through a normally-closed switch 32 to ground. The switch 32 may advantageously be of momentary-open type.

The relay 31 includes a first normally-open contact 33, which is connected in circuit with the operating power from the power supply section 11 and with the operating coil of the relay to provide a hold circuit for the relay. Another normally-open contact 34 of the relay 31 applies power to the coil of a relay 35, which is operative to complete a circuit through the contact 36 to a suitable alarm 37, which may be provided by a bell, buzzer, horn, or other such device.

Considering the parallel circuit 25*a*, for example, it will be seen that a line 40 is connected to extend from the juncture of the lamp 26*a* and the diode 27*a* to the grounding connection 41 of a conventional AC socket 42. The appliance being monitored, such as the TV receiver 43, is provided with a power cord having a mating AC plug 44 including a grounding lug or pin 45. The grounding pin 45 is connected through a circuit 46 to the power ground side 47 of the TV receiver line cord, with the circuit 46 being completed either within the plug 44 or internally of the TV receiver 43. When the plug 44 is connected with the socket 42 in the conventional manner, it will be seen that a circuit to ground is established along the line 40, the grounding pin 45, the circuit 46, and the power ground line 47 to the conventionally-grounded side 48 of the AC power source. It will also be seen that the aforementioned circuit to ground is electrically connected in shunt across the diode 27*a* and the relay 31.

Each of the remaining parallel circuits 25*b*, 25*c*, . . . 25*n* is similarly provided with a shunt circuit through the corresponding power plug and power socket of the other TV receivers, although such other shunt circuits (excepting the shunt circuit for 25*n*) are omitted from the Figure for clarity of illustration and understanding.

Considering now the operation of the herein-disclosed embodiment of the present invention, it will be appreciated that a connected TV receiver establishes current flow from the terminal 18 of the power supply section 11, through the lamp 26*a*, and along the line 40 to ground, thereby illuminating the lamp 26*a* to provide an indication that this particular section of the alarm system is properly functioning and that the corresponding TV receiver 43 has not been disconnected. Similar circuits are completed through the remainder of the lamps and the corresponding connected TV receivers (or other appliances) to indicate that these other circuits are properly functioning and that the appliances have not become disconnected. Assuming now that the plug 44 is removed from the socket 42, the ground connection along the line 40 is broken and current now commences to flow along a circuit including the lamp 26*a*, the diode 27*a*, and the relay 31, causing the contacts 33 and 34 of the relay to become closed. The operating resistance of each of the lamps 26, and the coil resistance of the relay 31, are selected such that the current now flowing through the lamp 26*a* (for example) and the relay 31 is sufficient to actuate the relay but is insufficient to maintain illumination of the lamp 26*a*. Thus, disconnection of the plug 44 from the socket 42 immediately extinguishes the lamp 26*a* and completes a circuit through the contact 34, the relay 35, and the contact 36 to operate the alarm 37. The holding circuit established through the contact 33 maintains the relay 31 actuated even though the plug 44, or possibly a dummy plug provided by a thief, is immediately reinserted into the socket 42. The holding circuit through the relay 31 can be broken by momentary opening of the switch 32.

The diodes 27 are provided in each of the parallel circuits 25 to isolate each of these individual parallel circuits, so that a lamp 26*b*, for example, cannot be falsely maintained illuminated through a ground circuit 40 associated with the parallel circuit 25*a*, for example.

It can be seen that a circuit has been disclosed in which the connection of each TV receiver or other appliance is continuously indicated by a corresponding illuminated lamp, and in which the disconnection of any such receiver is immediately signalled by extinguishment of that lamp and concurrent signalling of the alarm 37. If one of the lamps becomes burned out, alternatively, the lamp simply becomes extinguished with no resulting operation of the alarm 37, since the shunt around the relay 31 is maintained through the circuit including the line 40. The line 40 can be provided with any practical length of small-gauge wire, since relatively low operating voltage is involved and the present invention does not require a resistance bridge circuit.

Each of the lamps 26 may advantageously be provided with quick-disconnect sockets so that the authorized disconnection of a TV receiver by a repairman, for example, can be preceded by removal of the corresponding lamp to prevent unwanted operation of the alarm 37.

The lamps 26 can advantageously be selected with a rated operating voltage of approximately twice the voltage supplied to the terminal 18 by the power supply section 11, thereby permitting greatly increased operating life of the lamps 26 and also insuring against inadvertent lamp burnout caused by momentary power surges.

Although the present invention has been described in the context of an appliance theft alarm system, this invention can be readily adapted to monitor the presence or absence of other conditions. For example, the parallel circuit 25*n* is connected by a line 50 to ground through a detection device 51 and a plug-socket combination 52 corresponding to the plug 44 and the socket 42 as described previously. The detection device 51 may be operative to detect fire, for example, and may include a fusable link 53 designed to melt when the ambient temperature reaches a predetermined level, such as 130°F. It will be seen, accordingly, that extinguishment of the lamp 26*n* and concurrent operation of the alarm 37 means either that the plug-socket 52 has been disconnected or that the circuit through the detection device 51 has become opened. Appropriate personnel can be immediately dispatched to determine which of these events has in fact occurred and to take the appropriate remedial action.

The alarm system of the present invention requires no visible apparatus or devices to be installed in the room where the TV receiver or other appliance is located, since all room wiring is concealed in the outlet box and the appliance plug. Since the separate alarm circuits are in parallel, the total capacity of the system is limited only by the capacity of the power supply section to supply operating current to all of the indicator lamps concurrently.

It will be understood of course that the foregoing relates only to a preferred embodiment of the present invention, and that numerous alternations and modifications may be made therein without departing from the spirit and the scope of the invention as set forth in the appended claims.

We claim:

1. Apparatus for detecting unauthorized interruption of an established electric circuit, comprising:

first means for providing an indication that the established circuit is uninterrupted in response to the passage of a predetermined electric current through said first means;

second means operative to establish a signal condition in response to current flow therethrough;

said first means and second means being connected in series circuit for connection to a source of operating voltage;

third means establishing a circuit in shunt around said second means and including the unauthorized interruption circuit so that current flowing through said first means and said third means causes said indication of uninterruption by said first means while the unauthorized interruption circuit is uninterrupted and so that current flow through said second means upon interruption of the shunt circuit established by said third means causes said second means to establish said signal condition;

said first means having a first impedance and requiring at least a first amount of current to provide said indication;

said second means having a second impedance and requiring at least a second amount of current to establish said signal condition, said second amount of current being less than said first amount of current;

said first impedance allowing at least said first amount of current to flow in the series circuit including said first means and said third means, in response to the operating voltage, when said shunt circuit is uninterrupted; and said second impedance, upon interruption of said shunt circuit, allowing current flow in the series circuit including said first means and said second means in an amount which is less than said first amount of current and which is at least said second amount of current.

2. Apparatus as in claim 1, wherein:

said first means comprises a source of illumination, so that current flow through said source of illumination and said third means provides said indication of an uninterrupted circuit.

3. Apparatus as in claim 1, in which said electric circuit includes disconnectable circuit elements wherein:

said third means includes a first circuit extending from the circuit interconnection between said first and second means to a first disconnectable circuit element of the electric circuit;

said third means includes a second circuit extending from a second disconnectable circuit element of the electric circuit to establish said shunt around said second means; and said unauthorized interruption circuit includes a selectively disconnectable circuit connection between said first and second disconnectable circuit elements.

4. Apparatus as in claim 1, further comprising:

condition responsive means disposed in series circuit with said shunt circuit;

said condition responsive means operative in the absence of a certain condition to assume a closed-circuit state which maintains continuity in said shunt circuit and further operative in the presence of said certain condition to assume an open-circuit condition which disrupts such shunt circuit continuity to permit current flow through said second means for establishing said circuit condition.

5. Apparatus for detecting unauthorized interruption of one or more of plural established electric circuits, comprising:

a plurality of indication circuits corresponding in number to the plurality of electric circuits, each of said indication circuits including means for providing an indication that an established circuit is uninterrupted in response to the passage of a predetermined electric current therethrough;

second means operative to establish a signal condition in response to current flow therethrough;

said plural indication circuits being connected in parallel circuit with each other and said parallel circuit being connected in series circuit with said second means to receive a source of operating voltage;

each of said plural indication circuits including means operatively connected in series with the corresponding indicating means and operative to allow only unidirectional current flow in each indicating circuit;

a plurality of separate control circuit means connected to establish a corresponding plurality of circuits in shunt around said second means and a corresponding one of said unidirectional current flow means, each of said plural control circuit means including a corresponding one of such established circuits, so that current flowing through one of said indication circuits and the corresponding one of said control circuit means causes said indication of uninterruption by said first means while the established circuit associated with said one control circuit is uninterrupted and so that the current flow through said second means upon interruption of the shunt circuit provided by such established circuit causes said second means to establish signal condition.

6. Apparatus as in claim 5, wherein:

each of said indication means has a first impedance and requires at least a first amount of current to provide said indication;

said second means has a second impedance and requires at least a second amount of current to establish said signal condition, said second amount of current being less than said first amount of current;

said first impedance allows at least said first amount of current to flow in the series circuit including one of said indication circuits, a corresponding one of said unidirectional current flow means, and a corresponding one of said shunt circuits, in response to the operating voltage, when said corresponding shunt circuit is uninterrupted; and said second impedance, upon termination of any of said shunt circuits, allows current flow in the series circuit including one of said indication circuits and said second means in an amount which is less than said first amount of current and which is at least said second amount of current.

7. Apparatus as in claim 6, wherein:

each of said indication means comprises a source of illumination so that current of at least said first amount flowing through said indication means and a corresponding one of said control circuit means provides said indication that the established circuit of said one control circuit means is uninterrupted.

8. Apparatus as in claim 6, wherein:

said unidirectional current flow means in each indication circuit comprises a diode connected in series with the corresponding indicating means in polarity relation to permit current flow through the corresponding indicating means and said second means, when the shunt circuit associated with such indication circuit is interrupted, and to prevent current flow through the corresponding indicating means and an uninterrupted shunt circuit associated with another of said indication circuits.

9. Apparatus as in claim 6, further comprising:

condition responsive means disposed in series circuit with at least one of said control circuit means;

said condition responsive means operative in the absence of a predetermined condition to assume a closed-circuit state and further operative in the presence of said predetermined condition to assume an open-circuit condition which interrupts the shunt circuit established by said control circuit means.

* * * * *